US006988033B1

(12) United States Patent
Lowrey et al.

(10) Patent No.: US 6,988,033 B1
(45) Date of Patent: Jan. 17, 2006

(54) INTERNET-BASED METHOD FOR DETERMINING A VEHICLE'S FUEL EFFICIENCY

(75) Inventors: Larkin Hill Lowrey, La Jolla, CA (US); Bruce Lightner, La Jolla, CA (US); Matthew J. Banet, Del Mar, CA (US); Diego Borrego, San Diego, CA (US); Chuck Myers, La Jolla, CA (US); Jim Cowart, Franklin, MA (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 0 days.

(21) Appl. No.: 10/456,246

(22) Filed: Jun. 6, 2003

Related U.S. Application Data

(63) Continuation of application No. 09/922,954, filed on Aug. 6, 2001, now Pat. No. 6,594,579.

(51) Int. Cl.
*G06F 19/00* (2006.01)

(52) U.S. Cl. ......................... 701/123; 701/104; 701/24; 701/29; 340/439; 340/450

(58) Field of Classification Search ................. 701/123, 701/29, 36
See application file for complete search history.

(56) References Cited

U.S. PATENT DOCUMENTS 3,748,894 A 7/1973 White et al.
4,258,421 A 3/1981 Juhasz et al.
4,602,127 A 7/1986 Neely et al.

(Continued)

FOREIGN PATENT DOCUMENTS

EP 0816820 A2 1/1998
WO WO 00/40038 7/2000
WO WO 00/79727 12/2000

OTHER PUBLICATIONS

U.S. Appl. No. 09/776,033, filed Feb. 1, 2001, Banet et al.
U.S. Appl. No. 09/808,690, filed Mar. 14, 2001, Lowrey et al.
U.S. Appl. No. 09/922,954, filed Aug. 6, 2001, Lowrey et al.
U.S. Appl. No. 10/810,373, filed Mar. 26, 2004, Lowrey et al.
U.S. Appl. No. 10/823,478, filed Apr. 13, 2004, Williams et al.
U.S. Appl. No. 10/831,952, filed Apr. 26, 2004, Hunt et al.
U.S. Appl. No. 10/841,724, filed May 7, 2004, Lightner et al.
RD–422061 A; Anonymous; Jun. 10, 1999; Abstract, Using Internet for vehicle diagnostics–enabling using to operate vehicle personal computer to direct web browser to vehicle diagnostics website . . .

(Continued)

*Primary Examiner*—Y. Beaulieu
(74) *Attorney, Agent, or Firm*—Stephen C. Glazier; Kirkpatrick & Lockhart Nicholson Graham

(57) ABSTRACT

The invention provides a method and device for characterizing a vehicle's fuel efficiency and amount of fuel consumed. The method features the steps of: 1) generating a data set from the vehicle that includes vehicle speed, odometer calculation, engine speed, load, mass air flow; 2) transferring the data set to a wireless appliance that includes i) a microprocessor, and ii) a wireless transmitter in electrical contact with the microprocessor; 3) transmitting a data packet comprising the data set or a version thereof with the wireless transmitter over an airlink to a host computer system; and 4) analyzing the data set with the host computer system to determine a status of the vehicle's fuel efficiency.

99 Claims, 8 Drawing Sheets

U.S. PATENT DOCUMENTS

| | | | | |
|---|---|---|---|---|
| 4,690,475 | A | | 9/1987 | McElroy |
| 4,694,408 | A | | 9/1987 | Zaleski |
| 4,926,330 | A | | 5/1990 | Abe et al. |
| 4,956,777 | A | | 9/1990 | Cearley et al. |
| 5,026,293 | A | | 6/1991 | Wilson |
| 5,050,080 | A | | 9/1991 | Abe |
| 5,157,610 | A | | 10/1992 | Asano et al. |
| 5,289,378 | A | | 2/1994 | Miller et al. |
| 5,343,906 | A | | 9/1994 | Tibbals, III |
| 5,442,553 | A | | 8/1995 | Parrillo |
| 5,450,321 | A | | 9/1995 | Crane |
| 5,463,567 | A | | 10/1995 | Boen et al. |
| 5,473,540 | A | | 12/1995 | Schmitz |
| 5,479,479 | A | | 12/1995 | Braitberg et al. |
| 5,532,927 | A | | 7/1996 | Pink et al. |
| 5,537,336 | A | | 7/1996 | Joyce |
| 5,574,427 | A | | 11/1996 | Cavallaro |
| 5,671,141 | A | | 9/1997 | Smith et al. |
| 5,680,328 | A | | 10/1997 | Skorupski et al. |
| 5,732,074 | A | | 3/1998 | Spaur et al. |
| 5,737,215 | A | | 4/1998 | Schricker et al. |
| 5,754,965 | A | | 5/1998 | Hagenbuch |
| 5,758,300 | A | | 5/1998 | Abe |
| 5,774,828 | A | | 6/1998 | Brunts et al. |
| 5,781,871 | A | | 7/1998 | Mezger et al. |
| 5,797,134 | A | | 8/1998 | McMillan et al. |
| 5,798,647 | A | | 8/1998 | Martin et al. |
| 5,808,907 | A | | 9/1998 | Shetty et al. |
| 5,828,585 | A | | 10/1998 | Welk et al. |
| 5,850,209 | A | | 12/1998 | Lemke et al. |
| 5,884,202 | A | | 3/1999 | Arjomand |
| 5,928,292 | A | | 7/1999 | Miller et al. |
| 5,941,918 | A | | 8/1999 | Blosser |
| 5,964,821 | A | | 10/1999 | Brunts et al. |
| 6,064,970 | A | | 5/2000 | McMillan et al. |
| 6,104,988 | A | | 8/2000 | Klarer |
| 6,141,611 | A | | 10/2000 | Mackey et al. |
| 6,167,426 | A | | 12/2000 | Payne et al. |
| 6,263,268 | B1 | | 7/2001 | Nathanson |
| 6,295,492 | B1 | | 9/2001 | Lang et al. |
| 6,338,152 | B1 | | 1/2002 | Fera et al. |
| 6,356,205 | B1 | | 3/2002 | Salvo et al. |
| 6,400,701 | B2 | | 6/2002 | Lin et al. |
| 6,408,232 | B1 | | 6/2002 | Cannon et al. |
| 6,429,773 | B1 | | 8/2002 | Schuyler |
| 6,442,460 | B1 | | 8/2002 | Larson et al. |
| 6,459,988 | B1 | | 10/2002 | Fan et al. |
| 6,487,479 | B1 | | 11/2002 | Nelson |
| 6,487,494 | B2 | | 11/2002 | Odinak et al. |
| 6,487,717 | B1 | | 11/2002 | Brunemann et al. |
| 6,496,777 | B2 | | 12/2002 | Tennison et al. |
| 6,502,030 | B2 | | 12/2002 | Hilleary |
| 6,505,106 | B1 | | 1/2003 | Lawrence et al. |
| 6,522,267 | B2 | | 2/2003 | Flick |
| 6,526,460 | B1 | | 2/2003 | Dauner et al. |
| 6,529,159 | B1 | | 3/2003 | Fan et al. |
| 6,552,682 | B1 | | 4/2003 | Fan et al. |
| 6,556,889 | B2 | | 4/2003 | Rudick et al. |
| 6,556,905 | B1 | | 4/2003 | Mittelsteadt et al. |
| 6,564,127 | B1 | | 5/2003 | Bauerle et al. |
| 6,580,916 | B1 | | 6/2003 | Weisshaar et al. |
| 6,594,579 | B1 | * | 7/2003 | Lowrey et al. ............ 701/123 |
| 6,604,032 | B1 | | 8/2003 | Moller |
| 6,604,033 | B1 | | 8/2003 | Banet et al. |
| 6,609,051 | B2 | | 8/2003 | Fiechter et al. |
| 6,611,686 | B1 | | 8/2003 | Smith et al. |
| 6,611,739 | B1 | | 8/2003 | Harvey et al. |
| 6,611,740 | B2 | | 8/2003 | Lowrey et al. |
| 6,611,755 | B1 | | 8/2003 | Coffee et al. |
| 6,636,790 | B1 | | 10/2003 | Lightner et al. |
| 6,675,081 | B2 | | 1/2004 | Shuman et al. |
| 6,687,587 | B2 | | 2/2004 | Kacel |
| 6,718,425 | B1 | | 4/2004 | Pajakowski et al. |
| 6,732,031 | B1 | | 5/2004 | Lightner et al. |
| 6,732,032 | B1 | | 5/2004 | Banet et al. |
| 6,751,479 | B1 | | 6/2004 | Kupczyk et al. |
| 6,845,362 | B2 | | 1/2005 | Furuta et al. |
| 2001/0016789 | A1 | | 8/2001 | Staiger |
| 2001/0033225 | A1 | | 10/2001 | Razavi et al. |
| 2002/0008644 | A1 | | 1/2002 | Flick |
| 2002/0008645 | A1 | | 1/2002 | Flick et al. |
| 2002/0016655 | A1 | | 2/2002 | Joao |
| 2002/0029101 | A1 | | 3/2002 | Larson et al. |
| 2002/0032505 | A1 | | 3/2002 | Good |
| 2002/0078458 | A1 | | 6/2002 | Furon et al. |
| 2002/0133273 | A1 | | 9/2002 | Lowrey et al. |
| 2002/0140545 | A1 | | 10/2002 | Nietupski et al. |
| 2002/0143446 | A1 | | 10/2002 | Rogers et al. |
| 2002/0173889 | A1 | | 11/2002 | Odinak et al. |
| 2003/0004624 | A1 | | 1/2003 | Wilson et al. |
| 2003/0009270 | A1 | | 1/2003 | Breed |
| 2003/0078722 | A1 | | 4/2003 | Odinak et al. |
| 2003/0083809 | A1 | | 5/2003 | Hatano |
| 2003/0093204 | A1 | | 5/2003 | Adachi et al. |
| 2003/0130005 | A1 | | 7/2003 | Weisshaar et al. |
| 2003/0139179 | A1 | | 7/2003 | Fuchs et al. |
| 2003/0147534 | A1 | | 8/2003 | Ablay et al. |
| 2003/0231118 | A1 | | 12/2003 | Kitson |
| 2003/0236596 | A1 | | 12/2003 | Eisenmann et al. |
| 2004/0023645 | A1 | | 2/2004 | Olsen et al. |
| 2004/0039502 | A1 | | 2/2004 | Wilson et al. |
| 2004/0044454 | A1 | | 3/2004 | Ross et al. |

OTHER PUBLICATIONS

Bary W. Wilson et al., Modular system for multiparameter in–line machine fluid analysis (Technology showcase Apr. 3–6, 2000).

U.S. Appl. No. 09/776,083, filed Feb. 1, 2001, Banet et al.

U.S. Appl. No. 09/776,106, filed Feb. 1, 2001, Lightner et al.

U.S. Appl. No. 09/804,888, filed Mar. 13, 2001, Lowrey et al.

U.S. Appl. No. 09/908,440, filed Jul. 18, 2001, Lightner et al.

U.S. Appl. No. 10/301,010, filed Nov. 21, 2002, Lightner et al.

U.S. Appl. No. 10/431,947, filed May 8, 2003, Hunt et al.

U.S. Appl. No. 10/447,713, filed May 29, 2003, Lightner et al.

U.S. Appl. No.10/456,788, filed Jun. 6, 2003, Banet et al.

U.S. Appl. No. 10/614,665, filed Jul. 7, 2003, Lowrey et al.

U.S. Appl. No. 10/615,516, filed Jul. 8, 2003, Lightner et al.

U.S. Appl. No. 10/625,942, filed Jul. 24, 2003, Banet et al.

U.S. Appl. No. 10/626,779, filed Jul. 24, 2003, Lightner et al.

U.S. Appl. No. 10/626,810, filed Jul. 24, 2003, Lowrey et al.

U.S. Appl. No. 10/632,033, filed Jul. 31, 2003, Banet et al.

* cited by examiner

INTERNET-BASED METHOD FOR DETERMINING A VEHICLE'S FUEL EFFICIENCY

This application is a continuation application of U.S. patent application Ser. No. 09/922,954, filed Aug. 6, 2001, now U.S. Pat. No. 6,594,579, the contents of which are incorporated herein by reference.

FIELD OF THE INVENTION

The present invention relates to use of an internet-based system for determining a vehicle's fuel efficiency (e.g., gas mileage).

BACKGROUND OF THE INVENTION

The Environmental Protection Agency (EPA) requires vehicle manufacturers to install on-board diagnostics (e.g., microcontrollers and sensors, called 'OBD-II systems') for monitoring light-duty automobiles and trucks beginning with model year 1996. OBD-II systems monitor the vehicle's electrical, mechanical, and emissions systems and generate data that are processed by a vehicle's engine control unit (ECU) to detect malfunctions or deterioration in the vehicle's performance. Most ECUs transmit status and diagnostic information over a shared, standardized electronic buss in the vehicle. The buss effectively functions as an on-board computer network with many processors, each of which transmits and receives data.

Sensors that monitor the vehicle's engine functions (e.g., spark controller, fuel controller) and power train (e.g., engine, transmission systems) generate data that pass across the buss. Such data are typically stored in random-access memory in the ECU and include parameters such as vehicle speed (VSS), engine speed (RPM), engine load (LOAD), and mass air flow (MAF). Some vehicles (e.g., certain 2001 Toyota Camrys) lack a MAF sensor, in which case the MAF datum is not available from the ECU. Nearly all OBD-compliant vehicles, however, report VSS, RPM, and LOAD. When present, these and other data are made available through a standardized, serial 16-cavity connector referred to herein as an 'OBD-II connector'. The OBD-II connector is in electrical communication with the ECU and typically lies underneath the vehicle's dashboard. A diagnostic tool called a 'scan tool' typically connects to the OBD-II connector and downloads diagnostic data when a vehicle is brought in for service.

BRIEF SUMMARY OF THE INVENTION

It is an object of the present invention to provide a wireless, internet-based system for monitoring a vehicle's fuel efficiency. Specifically, it is an object of the invention to access data from a vehicle while it is in use, transmit a data set wirelessly through a network and to a website, and analyze the data set with a host computer system to determine the vehicle's fuel efficiency. This means this property can be analyzed accurately and in real-time without having to take the vehicle into a service or diagnostic station. The fuel efficiency, in turn, can characterize related problems with the vehicle, such as under-inflated tires or a clogged fuel-injection system. The host computer system also hosts an Internet-accessible website that can be viewed by the vehicle's owner, his mechanic, or other parties. The web site also includes functionality to enhance the data being collected, e.g. it can be used to collect a different type of diagnostic data or the frequency at which the data are collected. Most ECUs do not directly calculate fuel efficiency. Thus, the system must collect data related to fuel efficiency and transmit it to the host computer system. This system, in turn, calculates fuel efficiency from these data as described in detail below.

In one aspect, the invention provides a method and device for characterizing a vehicle's fuel efficiency and amount of fuel consumed. The method features the steps of: 1) generating data from the vehicle that can include vehicle speed, engine speed, load, mass air flow, and manifold air pressure; 2) transferring the data to a wireless appliance that includes i) a microprocessor, and ii) a wireless transmitter in electrical contact with the microprocessor; 3) transmitting a data packet comprising the data or properties calculated from the data with the wireless transmitter over an airlink to a host computer system; and 4) analyzing the data or properties calculated from the data with the host computer system to determine a vehicle's fuel efficiency.

In embodiments, the generating and transferring steps are performed at a first time interval (e.g., about 20 seconds) and the transmitting and analyzing steps are performed at a second time interval (e.g., once a day).

The method typically includes the step of processing at least one of the following properties from the data set: vehicle speed, odometer calculation, engine speed, load, manifold air flow, and manifold air pressure. This is typically done following the transferring step. In this case, 'processing' typically includes summing or integrating at least one of the properties from the data set, or a property derived thereof, to yield a summed property. For example, the data parameters can be integrated with respect to the time interval that they are collected. The summed or integrated property is then multiplied by a time interval to complete the integration process. The microprocessor contained in the wireless appliance typically performs these steps prior to the transmitting step.

For example, an odometer calculation is typically not available from a vehicle's ECU. It must therefore be calculated by querying the ECU at a relatively high frequency to determine the vehicle's speed, and then assuming that the speed is constant between queries. With this assumption, the speed can be multiplied by the time between queries to determine the distance driven. This distance can then be summed and then transmitted to determine an odometer calculation. This method is described in more detail in the patent application entitled 'WIRELESS DIAGNOSTIC SYSTEM FOR CHARACTERIZING MILEAGE, FUEL LEVEL, AND PERIOD OF OPERATION FOR ONE OR MORE VEHICLES', U.S. Ser. No. 09/776,083, filed Feb. 1, 2001, the contents of which are incorporated by reference. A similar integration method can be applied to MAF, LOAD, and LOAD times RPM, as described in more detail below, to determine fuel consumed and fuel efficiency.

MAF is typically the integrated property, and the analyzing step further comprises processing the resulting data to determine an amount of fuel consumed. For example, the analyzing step can include: 1) dividing the integrated MAF by an air/fuel ratio; and 2) dividing the results from step 1) by a density of fuel to determine a volume of fuel consumed. The analyzing step further includes dividing the amount of fuel consumed by a distance driven to determine fuel efficiency.

In other embodiments, the integrated property is LOAD or LOAD times RPM, and the analyzing step further comprises processing the integrated value to determine an amount of fuel consumed. For example, the microprocessor can integrate LOAD or LOAD times RPM to generate a value that is then multiplied by a constant to determine an integrated, synthetic mass air flow. This property is then processed as described above to determine both an amount of fuel consumed and fuel efficiency. As described in more detail below, for some vehicles an integrated LOAD value correlates well with fuel efficiency, while in others it is an integrated LOAD times RPM that correlates.

In other embodiments, the analysis step further includes processing the vehicle's fuel efficiency to determine a secondary property of the vehicle, e.g. tire pressure, status of a fuel-injection system, or fuel quality.

In still other embodiments, the method includes comparing the vehicle's fuel efficiency to a pre-determined criteria (e.g., a recommended fuel efficiency). The method can also include a step where the vehicle's fuel efficiency or a property derived from the fuel efficiency is sent to a user using, e.g. an electronic text, data, or voice message. This message can be sent to a computer, cellular telephone, or wireless device. The message can describe a status of the vehicle's fuel efficiency or fuel consumption. The method can also include the step of displaying the data set and/or fuel efficiency on an Internet-accessible web site.

The method includes processing the data packet with the host computer system to retrieve the data set or a version thereof. In this case, a 'version thereof' means a representation (e.g. a binary or encrypted representation) of data in the data set that may not be exactly equivalent to the original data retrieved from the ECU. The data set or portions thereof are typically stored in a database comprised by the host computer system.

The wireless network can be a data network such Cingular's Mobitex network, Motient's DataTAC network, or Skytel's Reflex network, or a conventional voice or cellular network. The wireless appliance typically operates in a 2-way mode, i.e. it can both send and receive data. For example, it can receive data that modifies the frequencies at which it sends out data packets or queries the ECU, or the data that it collects from the ECU. Such a wireless appliance is described in the application WIRELESS DIAGNOSTIC SYSTEM FOR VEHICLES; filed Feb. 1,200, the contents of which are incorporated herein by reference.

In the above-described method, the term 'airlink' refers to a standard wireless connection (e.g., a connection used for wireless telephones or pagers) between a transmitter and a receiver. This term describes the connection between the wireless transmitter and the wireless network that supports data transmitted by this component. Also in the above-described method, the 'generating' and 'transmitting' steps can be performed at any time and with any frequency, depending on the diagnoses being performed. For a 'real-time' diagnoses of a vehicle's engine performance, for example, the steps may be performed at rapid time or mileage intervals (e.g., several times each minute, or every few miles). Alternatively, other diagnoses may require the steps to be performed only once each year or after a large number of miles are driven. Alternatively, the vehicle may be configured to automatically perform these steps at pre-determined or random time intervals. As described in detail below, the transmission frequency can be changed in real time by downloading a new 'schema' to the wireless appliance through the wireless network.

The term 'email' as used herein refers to conventional electronic mail messages sent over a network, such as the Internet. The term 'web page' refers to a standard, single graphical user interface or 'page' that is hosted on the Internet or worldwide web. A 'web site' typically includes multiple web pages, many of which are 'linked' together and can be accessed through a series of 'mouse clicks'. Web pages typically include: 1) a 'graphical' component for displaying a user interface (typically written in a computer language called 'HTML' or hypertext mark-up language); an 'application' component that produces functional applications, e.g. sorting and customer registration, for the graphical functions on the page (typically written in, e.g., C++ or java); and a database component that accesses a relational database (typically written in a database-specific language, e.g. SQL*Plus for Oracle databases).

The invention has many advantages. In particular, wireless, real-time transmission and analysis of data, followed by analysis and display of these data using a web site hosted on the Internet to determine a vehicle's fuel efficiency or fuel consumption, makes it possible to characterize the vehicle's performance in real-time from virtually any location that has Internet access, provided the vehicle being tested includes the above-described wireless appliance. Analysis of these data, coupled with analysis of transmitted diagnostic trouble codes, ultimately means that many problems associated with fuel efficiency can be quickly and efficiently diagnosed. When used to continuously monitor vehicles, the above-mentioned system can notify the vehicle's owner precisely when the vehicle's fuel efficiency falls below a user-defined pre-set level. In this way, problems that affect fuel efficiency, such as under-inflated tires, clogged fuel-injections systems, engine oil level, can be identified and subsequently repaired.

The wireless appliance used to access and transmit the vehicle's data is small, low-cost, and can be easily installed in nearly every vehicle with an OBD-II connector in a matter of minutes. It can also be easily transferred from one vehicle to another, or easily replaced if it malfunctions. No additional wiring is required to install the appliance.

These and other advantages of the invention are described in the following detailed disclosure and in the claims.

BRIEF DESCRIPTION OF DRAWINGS

The features and advantages of the present invention can be understood by reference to the following detailed description taken with the drawings, in which.

DESCRIPTION OF THE PREFERRED EMBODIMENTS

Figure 1:
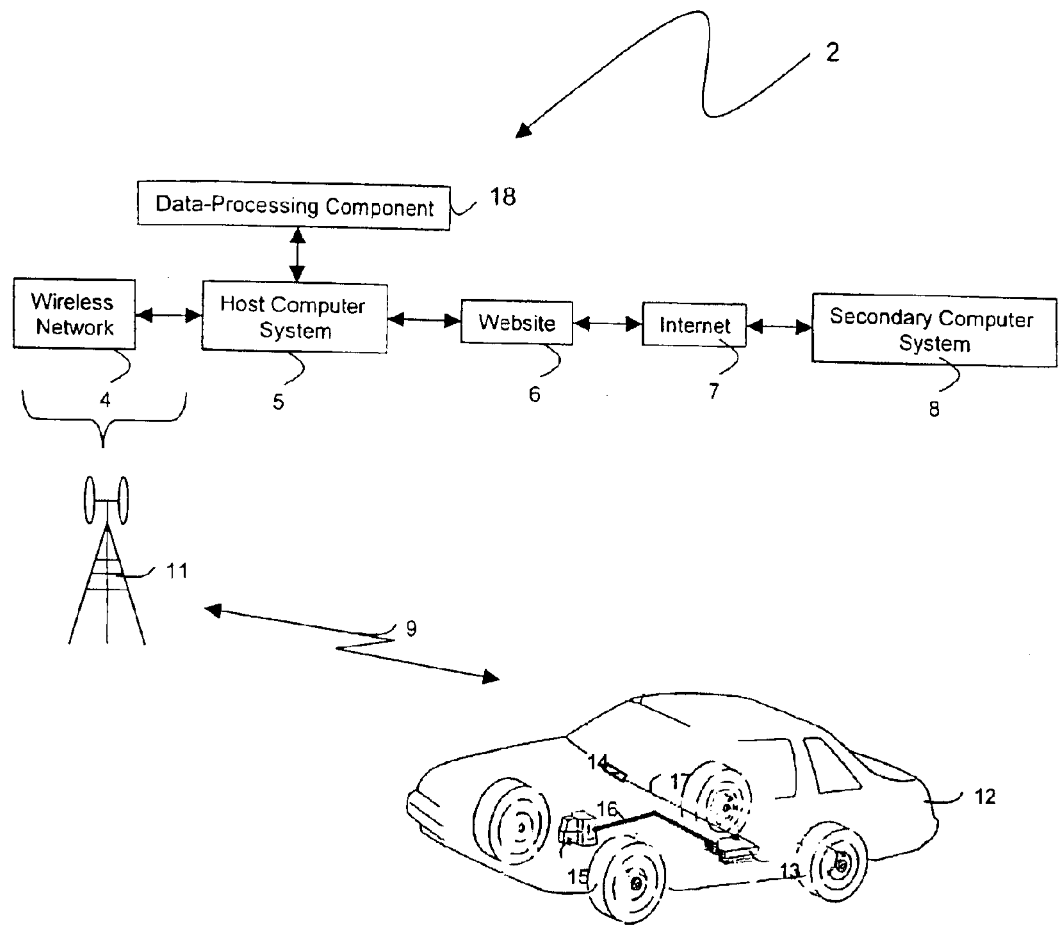
FIG. 1 is a schematic drawing of a system for performing a wireless, Internet-based method for determining a vehicle's fuel efficiency featuring a vehicle transmitting data across an airlink to an Internet-accessible host computer system.

FIG. 1 shows a schematic drawing of an Internet-based system 2 that performs a wireless determination of fuel efficiency for a vehicle 12. A wireless appliance 13 in the vehicle 12 measures diagnostic data that includes MAF, LOAD, RPM, and VSS. The wireless appliance 13 transmits these and other data in a data packet over an airlink 9. As described in more detail below, the data packet propagates through a wireless network 4 to a web site 6 hosted by a host computer system 5. A user accesses the web site 6 with secondary computer system 8 through the Internet 7. The host computer system 5 also features a data-processing component 18 that analyzes the above-mentioned data as described below to determine the vehicle's fuel efficiency. The host computer system 5 can additionally analyze fuel efficiency to determine other problems with the vehicle, e.g. under-inflated tires or clogged fuel injectors.

The wireless appliance 13 disposed within the vehicle 12 collects diagnostic data by querying the vehicle's engine computer 15 through a cable 16. In response to a query, the engine computer 15 retrieves data stored in its memory and sends it along the same cable 16 to the wireless appliance 13. The appliance 13 typically connects to an OBD-II connector (not shown in the figure) located under the vehicle's dashboard. This connector is mandated by the EPA and is present in nearly all vehicles manufactured after 1996.

The wireless appliance 13 includes a data-collection component (not shown in the figure) that formats the data in a packet and then passes the packet to a wireless transmitter (also not shown in the figure), which sends it through a second cable 17 to an antenna 14. For example, the data-collection component is a circuit board that interfaces to the vehicle's engine computer 16 through the vehicle's OBD-II connector, and the wireless transmitter is a radio modem.

To calculate fuel efficiency the wireless appliance 13 integrates several data measured from the vehicle's engine computer. For example, to determine an ODO value, the wireless appliance 13 integrates the vehicles VSS value (units of miles/hour) with respect to time. The resulting value thus has units of 'miles'. Similarly, to determine fuel efficiency, the appliance integrates MAF with respect to time to generate ΣMAF, which has units of 'grams'. LOAD is integrated with respect to time to generate ΣLOAD, which has units of '$\text{time}^{-1}$'. LOAD*RPM is integrated with respect to time to generate ΣLOAD*RPM, which has units of 'revs'. The algorithms for processing ΣMAF, ΣLOAD, and ΣLOAD*RPM to determine fuel efficiency are described in more detail below. To perform the integration, the wireless appliance 13 queries the vehicle's engine computer 15 with a first, relatively high-frequency time interval (e.g. every 20 seconds) to retrieve and process the data. It is assumed that the queried property is constant between queries. The wireless appliance then multiplies the queried property by the querying time interval, and sums the resulting product to complete the integration. The appliance then transmits the integrated data with a longer time interval (e.g. every 10 minutes) so that it can be analyzed by the data-processing component 18. A data-collection 'schema' specifies these time intervals and the data that are collected. Such a schema is described in more detail in the application titled INTERNET-BASED VEHICLE-DIAGNOSTIC SYSTEM, filed Mar. 14, 2001, the contents of which are incorporated herein by reference.

The antenna 14 typically rests in the vehicle's shade band, disposed just above the dashboard, and radiates the data packet over the airlink 9 to a base station 11 included in the wireless network 4. The host computer system 5 connects to the wireless network 4 and receives the data packets. The host computer system 5, for example, may include multiple computers, software pieces, and other signal-processing and switching equipment, such as routers and digital signal processors. Data are typically transferred from the wireless network 4 to host computer system 5 through a TCP/IP-based connection, or with a dedicated digital leased line (e.g., a frame-relay circuit or a digital line running an X.25 upper-layer protocol). The host computer system 5 also hosts the web site 6 using conventional computer hardware (e.g. computer servers for a database and the web site) and software (e.g., web server and database software). A user accesses the web site 6 through the Internet 7 from the secondary computer system 8. The secondary computer system 8, for example, may be located in an automotive service center that performs conventional vehicle-diagnostic services.

The wireless appliance that provides diagnostic data to the web site is described in more detail in WIRELESS DIAGNOSTIC SYSTEM FOR VEHICLES, filed Feb. 1, 200, the contents of which have been previously incorporated by reference. The appliance transmits a data packet that contains information describing its status, an address describing its destination, an address describing its origin, and a 'payload' that contains the above-described data. These data packets are transmitted over conventional wireless network as described above.

Figure 2:
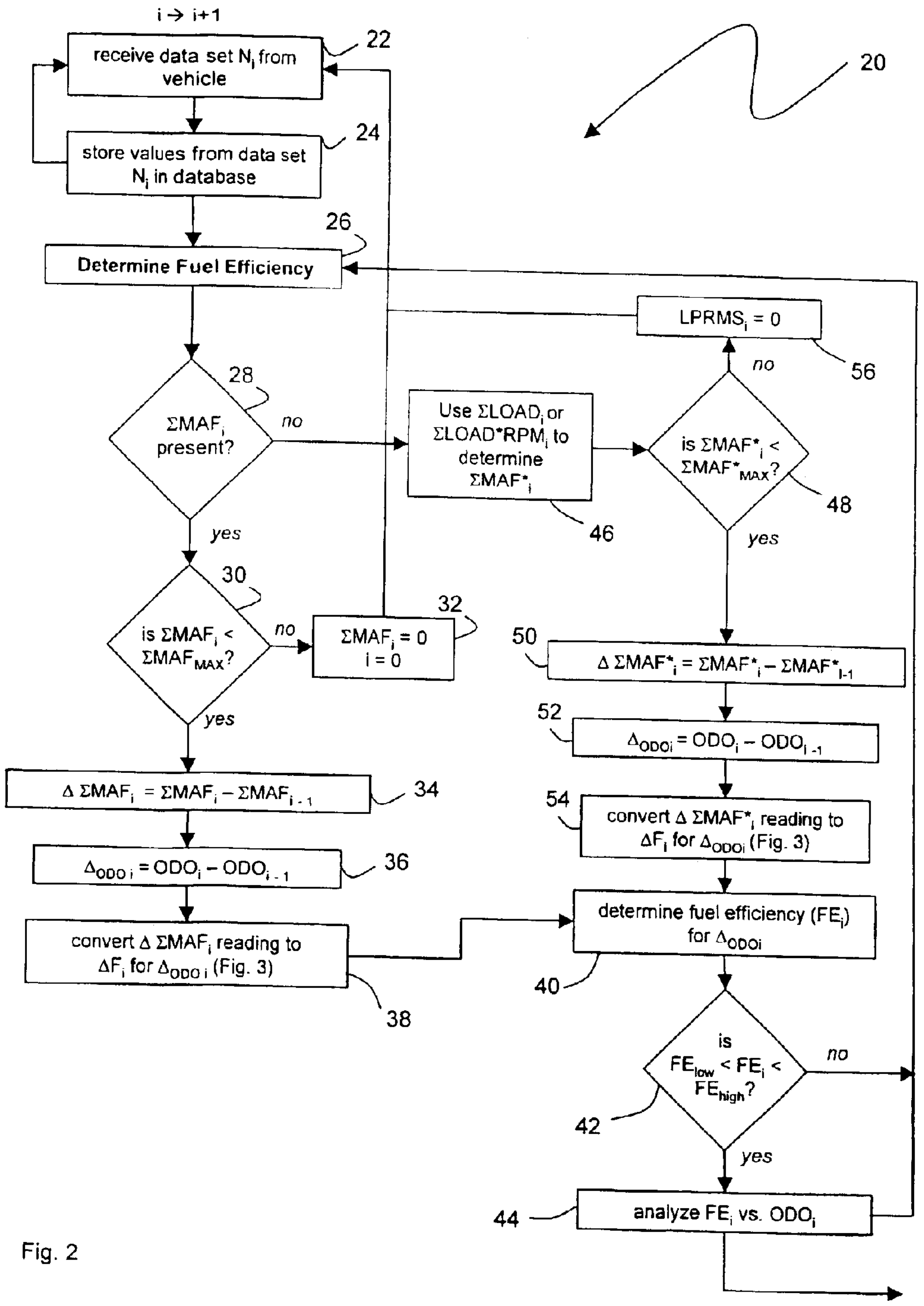
FIG. 2 is a flow chart describing a method used by the system of FIG. 1 to determine a vehicle's fuel efficiency from data such as MAF, RPM, LOAD, and odometer calculation (ODO)

FIG. 2 shows a flow chart describing a method 20 used by the host computer system (5 in FIG. 1) to determine a vehicle's fuel efficiency. In the method 20 the host computer system first receives a data set $N_i$ from the vehicle (step 22) that includes integrated data such as ΣMAF, ΣLOAD, ΣLOAD*RPM, ODO, and other properties. In this case, 'i', is an integer counting variable that defines the order in which the data set is received. Once the data set is collected from the vehicle, a database stores the values therein (step 24). This process is repeated as long as the vehicle transmits data packets. The host computer system initiates the fuel-efficiency calculation (step 26) at any time, e.g. for every data packet or in response to a command. The first step in the calculation is to determine if the data set includes the $\Sigma MAF_i$ datum (step 28). As described above, some vehicles lack MAF sensors, and thus this datum may not be present. If the $\Sigma MAF_i$ datum is present (step 28), the host computer compares the value $\Sigma MAF_i$ to $\Sigma MAF_{MAX}$ (step 30) in order to determine if the $\Sigma MAF_i$ value has 'rolled over'. In this case, 'rolled over' means that the $\Sigma MAF_i$ datum, which is typically a 32-bit number, has reached its maximum value ($\Sigma MAF_{MAX}=2^{32}$, or about 4.3 billion). When this is the case, $\Sigma MAF_i$ and i are both set to 0 (step 32), the next value $\Sigma MAF_{i+1}$ is retrieved from the data base (step 24), and steps 26, 28, and 30 are repeated. When $\Sigma MAF_i$ is less than $\Sigma MAF_{MAX}$, the method determines a difference ($\Delta\Sigma MAF_i$) between the present value ($\Sigma MAF_i$) and the one previously collected ($\Sigma MAF_{i-1}$) by subtracting the latter value from the former (step 34). In the case that $\Sigma MAF_{i-1}$ is not present (i.e., for the first value collected or immediately after $\Sigma MAF_i$ is rolled over), this parameter is assigned a value of 0, and thus $\Delta\Sigma MAF_i=\Sigma MAF_i$. The method then determines the actual miles driven between the time when successive data packets are sent, i.e. $\Delta_{ODOi}=ODO_i-ODO_{i-1}$ (step 36). As described in more detail with reference to FIG. 3, below, the method then uses the parameter $\Delta\Sigma MAF_i$ to calculate the amount of fuel consumed $\Delta F_i$ by the vehicle for the data set i (step 38). Based on these two values, $\Delta_{ODOi}$ and $\Delta F_i$, the method determines fuel efficiency $\Delta FE_i$ for the data set i (step 40) by dividing $\Delta F_i$ by $\Delta_{ODOi}$. In order to eliminate 'outliers', i.e. datum with erroneously high or low values, from the analysis, the method additionally compares $\Delta FE_i$ to high ($\Delta FE_{high}$) and low ($\Delta FE_{low}$) user-determined values (step 42). These values can be vehicle-dependent. For example, for a Toyota Camry, $\Delta FE_{high}$~50 miles per gallon and $\Delta FE_{low}$~0 miles per gallon. Outliers may occur, for example, if the wireless appliance queries the vehicle's engine computer when the vehicle is coasting down a steep hill (in this case $\Delta FE_i$ will be relatively high), or alternatively when the vehicle is pulling a heavy load (in this case $\Delta FE_i$ will be relatively low). If $\Delta FE_i$ is determined not to be an outlier, i.e. $\Delta FE_{low}<\Delta FE_i<\Delta FE_{high}$ (step 42), the method analyzes $\Delta FE_i$ (step 44) by, for example, plotting these data as a function of $\Delta_{ODOi}$ as shown in 5. If $\Delta FE_i$ is determined to be an outlier during step 42, i.e. $\Delta FE_{low}>\Delta FE_i$ or $\Delta FE_i>\Delta FE_{high}$, the fuel efficiency value is not included in the analysis of step 44 and the process of determining fuel efficiency is repeated (step 26).

Figure 3:
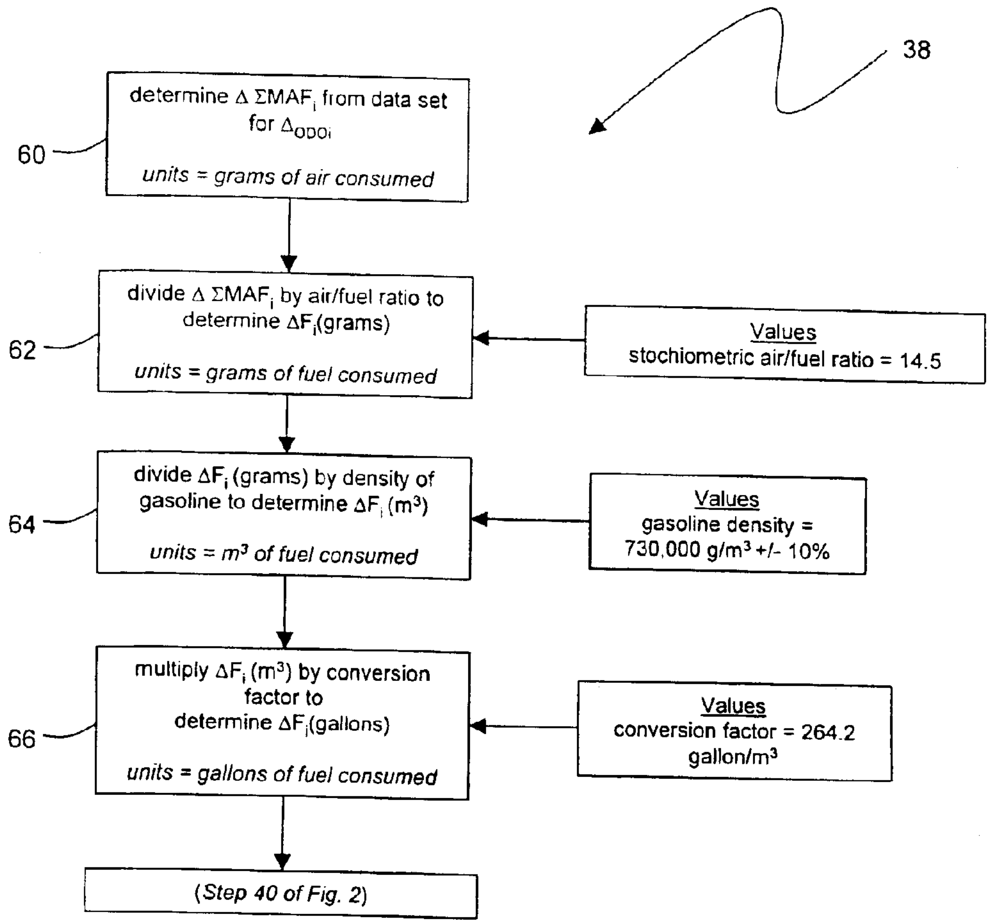
FIG. 3 is a flow chart describing a method from FIG. 2 for calculating fuel efficiency from MAF and ODO.

Referring to FIG. 3, step 38 involves converting the parameter $\Delta\Sigma MAF_i$, which refers to the mass of air consumed by the vehicle's engine between transmission of data sets 'i' and 'i−1', into a volume of fuel consumed. In this conversion $\Delta\Sigma MAF_i$ is determined from the data set (step 60) and has units of grams of air consumed by the engine (during $\Delta ODO_i$). $\Delta\Sigma MAF_i$ is converted into the mass of fuel consumed $\Delta F_i$(grams) by the engine during this interval (step 62) by dividing it by the engine's pre-set 'air/fuel ratio'. Vehicle engines are typically calibrated to run primarily in a closed-loop mode wherein a air/fuel ratio is set to a stochiometric value of 14.5. This means that a single gram of fuel is consumed for every 14.5 grams of air that is consumed. This value can vary depending on some limited operating conditions (e.g., high load, cold starts) that, in turn, depend on the state of the vehicle's engine. For example, during cold starts and at wide-open throttle, the vehicle often runs in an open-loop configuration, and the air/fuel ratio can be on the order of 12.

$\Delta F_i$(grams) determined during step 62 is converted into a volume of fuel ($\Delta F_i$($m^3$); step 64) by dividing it by the fuel's density, shown in the figure to be 730,000 g/$m^3$, with an error of +/−10%. The error in the fuel's density is attributed to, e.g., impurities, additives, variations in octane, variations in temperature, and variations in seasonal volatility. These factors may vary depending on the season (e.g., certain additives/formulations are included in fuel during summer months) and location (e.g., state-dependent regulations may mandate certain additives in fuel). $\Delta F_i$($m^3$) is then converted to $\Delta F_i$(gallons) by multiplying by a conversion factor of 264.2 gallon/$m^3$ (step 66). This yields an input value for step 40 of FIG. 2, leading to calculation of $FE_i$(miles/gallon).

Referring again to FIG. 1, a vehicle's fuel efficiency can also be calculated if a MAF sensor is not present, and consequently $\Sigma MAF_i$ is not included in the data set. In this case, a synthetic integrated MAF value, i.e. $\Sigma MAF^*_i$, is calculated from one of two sets of parameters: either integrated LOAD ($\Sigma LOAD_i$) or integrated LOAD*RPM ($\Sigma LOAD*RPM_i$). The correct parameter to use varies on a vehicle-by-vehicle basis, as it depends on how the vehicle's engine-control software is programmed. This is explained in more detail with reference to FIGS. 5, 7A, 7B, 8A, 8B. In either case, $\Sigma LOAD_i$ or $\Sigma LOAD*RPM_i$ is analyzed to determine $\Sigma MAF^*_i$ (step 46), which is then compared to $\Sigma MAF^*_{MAX}$ (step 48) to see if this value has 'rolled over'. As with $\Sigma MAF_{MAX}$, $\Sigma MAF^*_{MAX}$ is a 32-bit number with a value of about 4.3 billion ($2^{32}$). If $\Sigma MAF^*_i$ has rolled over, i.e. $\Sigma MAF^*_i>\Sigma MAF^*_{MAX}$, this property and i are set to 0 and the method is repeated. If $\Sigma MAF^*_i$ has not rolled over, it is subtracted by $\Sigma MAF^*_{i-1}$ to determine $\Delta\Sigma MAF^*_i$ (step 50). Similar to step 36, the method then calculates $\Delta ODO_i$ from $ODO_i-ODO_{i-1}$ to determine the miles driven between data sets i and i−1 (step 52). The method then determines $\Delta F_i$ from $\Delta\Sigma MAF^*_i$ using the same methodology described in FIG. 3 (step 54; in this case, all occurrences of $\Delta\Sigma MAF_i$ in FIG. 3 are replaced with $\Delta\Sigma MAF^*_i$). The method then converts $\Delta F_i$ into a $FE_i$ (step 40), checks for outliers (step 42), and analyzes $FE_i$ vs. $ODO_i$ (step 44) as described previously.

Figure 4:
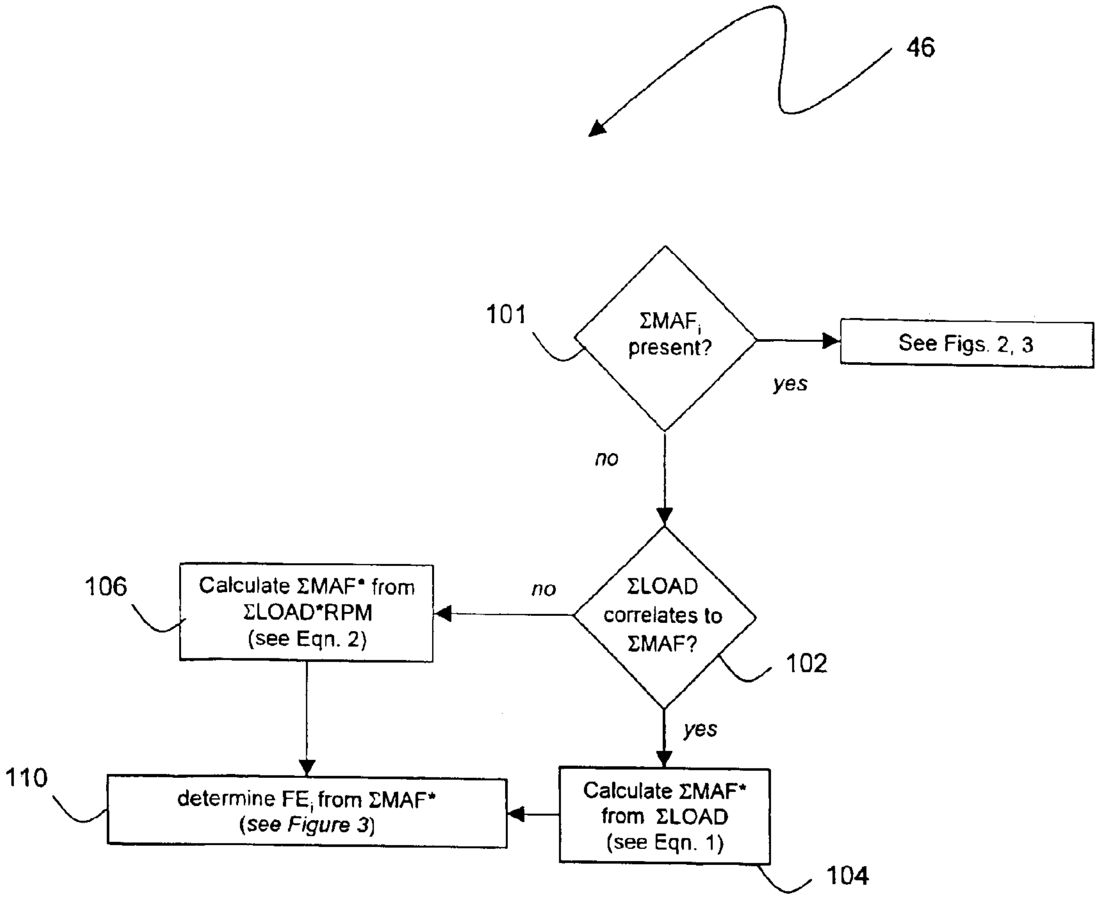
FIG. 4 is a flow chart describing a method from FIG. 2 for calculating fuel efficiency from either LOAD or LOAD times RPM.

FIG. 4 shows in more detail a method 46 that determines whether to use integrated LOAD ($\Sigma LOAD_i$) or integrated LOAD*RPM ($\Sigma LOAD*RPM_i$) to calculate $\Delta\Sigma MAF^*_i$. As described above, both $\Sigma LOAD_i$ and $\Sigma LOAD*RPM_i$ are integrated with respect to time. The method 46 is performed when $\Delta\Sigma MAF_i$ is not present in the data set (step 101), and involves choosing either $\Sigma LOAD*RPM_i$ or $\Sigma LOAD_i$ to calculate $\Delta\Sigma MAF^*_i$. As described in more detail below, the criteria for this choice is base on which of these quantities correlates linearly to $\Delta\Sigma MAF_i$.

As shown by FIGS. 7A, 7B, 8A, 8B, the correlation between $\Sigma LOAD*RPM_i$, $\Sigma LOAD_i$, and $\Delta\Sigma MAF_i$ varies on a vehicle-by-vehicle basis. Typically, the vehicle-dependent correlation between these properties is determined beforehand, and the results are input into a data table contained in a database. The method 46 then references the database to determine if it is $\Sigma LOAD_i$ or $\Sigma LOAD*RPM_i$ that correlates linearly to $\Delta\Sigma MAF_i$ (step 102).

If $\Sigma LOAD_i$ correlates linearly to $\Delta\Sigma MAF_i$, it indicates that the ECU's definition of load is the instantaneous rate of air mass processed by the engine during operation, normalized by the rate of air mass that could be processed by the engine at wide-open throttle for the same engine speed. In this case, the method determines $\Delta\Sigma MAF^*_i$ using equations 1 and 2 below (step 104):

$$\Delta\Sigma MAF^*_i(g)=A_1\Sigma LOAD_i \quad (1)$$

$$A_1(g/sec)=[V_d(L)*\eta_{v,wot}*370.3(g*°K/L)]*[T\ (°K)*\Delta t]^{-1}) \quad (2)$$

In equation 1, $\Sigma LOAD_i$ indicates that the LOAD value is integrated with respect to time. LOAD is dimensionless, and thus this quantity has units of time. In equation 2, $A_1$ is a constant related to the product of the engine displacement ($V_d$(L)), volumetric efficiency ($\eta_{v,wot}$, typically between 0.7 and 0.9), and a factor (370.3(g*°K/L)) related to the ideal gas laws and other conversion factors. This product is divided by the product of the temperature of air in the cylinder (T(°K)) multiplied by the time interval separating the queries to the ECU (Δt). Note: since the temperature of air in the cylinder (T(°K)) is typically not directly measurable, the inlet air temperature is used as an approximation.

Alternatively, $\Sigma LOAD*RPM_i$ may correlate linearly with $\Delta\Sigma MAF_i$. This indicates that the ECU's definition of load is the instantaneous mass of air processed by the engine during operation, normalized by the mass of air that could be processed by the engine at wide-open throttle at the same engine speed. In this case the method determines $\Delta\Sigma MAF^*_i$ using equations 3 and 4 below (step 106):

$$\Delta\Sigma MAF^*_i(g)=A_2\Sigma LOAD*RPM_i \quad (3)$$

$$A_2(g/rev)=[V_d(L)*\eta_{v,wot}*3.09(g*°K/rev*L)]*T(°K)^{-1} \quad (4)$$

In equation 3, $\Sigma LOAD*RPM_i$ indicates that the LOAD*RPM value is integrated with respect to time.

LOAD is dimensionless, and RPM has units of revs/time, and thus this term has units of revs. In equation 4, $A_2$ is a constant related to the product of the engine displacement ($V_d$(L)), volumetric efficiency ($\eta_{v,wot}$, as described above), and a correlation factor (3.09(g*°K/L)) related to the ideal gas laws and other conversion factors. This product is divided by the temperature of air in the cylinder (T(°K)).

Both steps 104 and 106 yield $\Delta\Sigma MAF^*_i$, which the method then processes to determine $FE_i$ as shown in FIG. 3 (step 110). In this case, $\Delta\Sigma MAF_i$ and $\Delta\Sigma MAF^*_i$ are interchanged for FIG. 3 and both processed according to the figure in order to determine $\Delta F_i$.

Figure 7A:
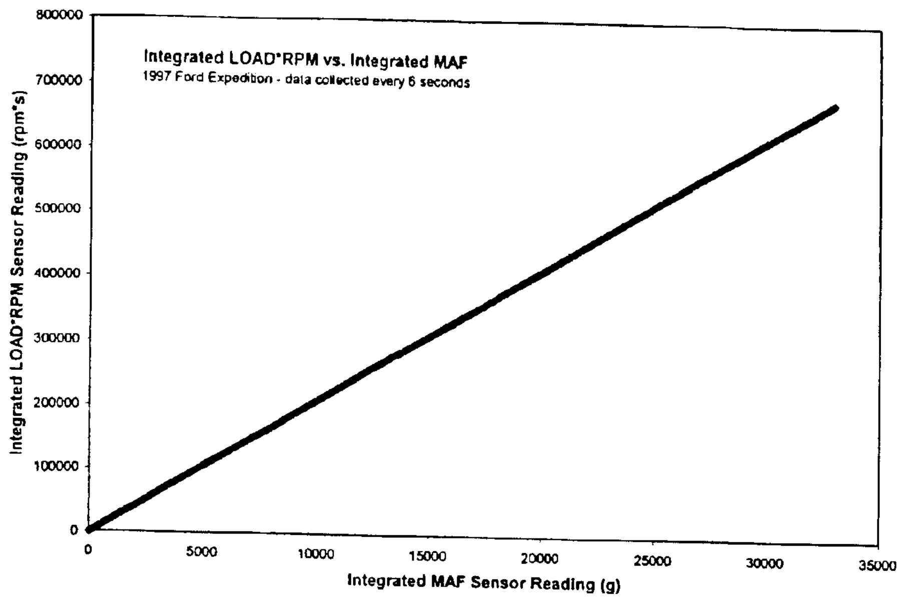
FIGS. 7A and 7B show, respectively, graphs of integrated LOAD*RPM vs. integrated MAF and integrated LOAD vs. integrated MAF measured from a 1997 Ford Explorer.
Figure 7B:
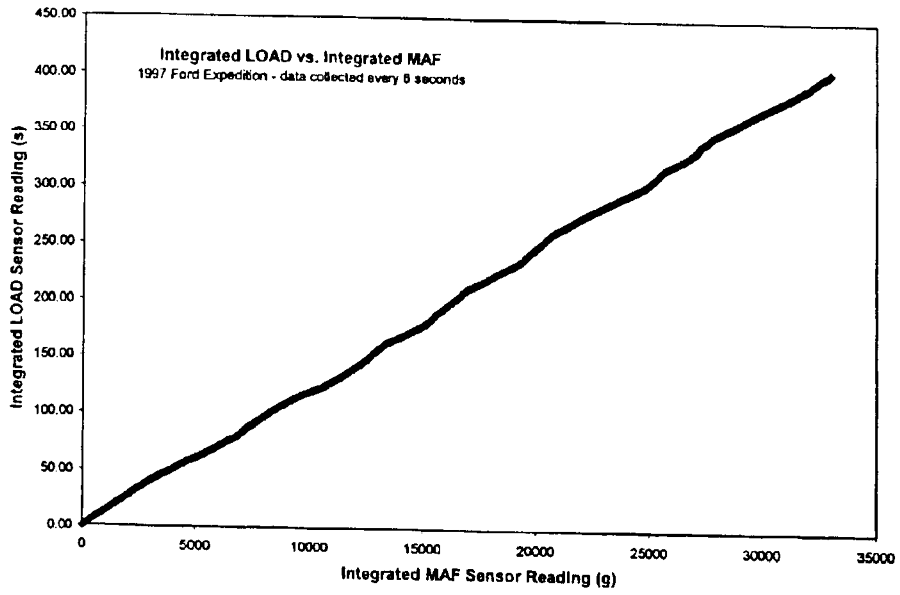

FIGS. 7A, 7B, 8A, and 8B illustrate the vehicle-dependent correlation between $\Sigma LOAD_i$ or $\Sigma LOAD{*}RPM_i$ and $\Delta\Sigma MAF_i$. FIGS. 7A and 7B show, respectively, $\Sigma LOAD{*}RPM_i$ vs. $\Delta\Sigma MAF_i$ and $\Sigma LOAD_i$ vs. $\Delta\Sigma MAF_i$ measured from a 1997 Ford Expedition using the above-described wireless appliance and analysis system of FIGS. 1 and 2. Data for these graphs are sent in data packets resulting from querying the vehicle's ECU every 6 seconds. A MAF sensor is present for this vehicle, and thus $\Delta\Sigma MAF_i$ along with $\Sigma LOAD_i$ and $\Sigma LOAD{*}RPM_i$ are included in the corresponding data sets. $\Delta\Sigma MAF^*_i$ is calculated from $\Sigma LOAD_i$ and $\Sigma LOAD{*}RPM_i$ as described above.

FIG. 7A shows the correlation between $\Sigma LOAD{*}RPM_i$ and $\Delta\Sigma MAF_i$. Each data point in the graph represents $\Delta\Sigma MAF_i$ and $\Sigma LOAD{*}RPM_i$ values from subsequent data packets transmitted by the wireless appliance in the Ford Expedition. In this case, the agreement between the two properties is nearly perfectly linear. Thus, if the Ford Expedition lacked a MAF sensor, equations 3 and 4 would be used to determine $\Delta\Sigma MAF^*_i$. This, in turn, could be used to calculate $FE_i$ as described above. In contrast, FIG. 7B shows $\Sigma LOAD_i$ plotted vs. $\Delta\Sigma MAF_i$ for the Ford. The wavy lines in the graph indicate that the correlation between the two properties is not perfectly linear. This means that equations 1 and 2 are not relevant in this case.

Figure 8A:
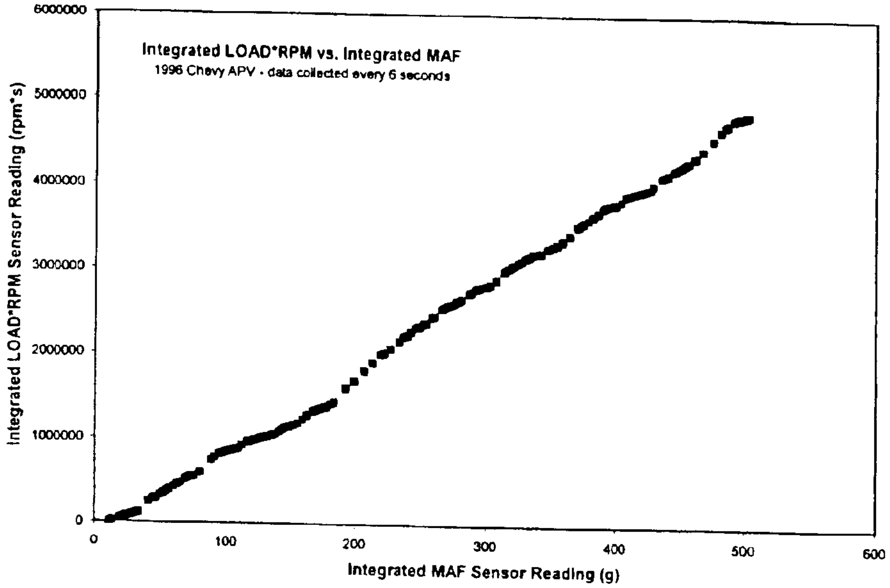
FIGS. 8A and 8B show, respectively, graphs of integrated LOAD*RPM vs. integrated MAF and integrated LOAD vs. integrated MAF measured from a 1996 Chevy MPV.
Figure 8B:
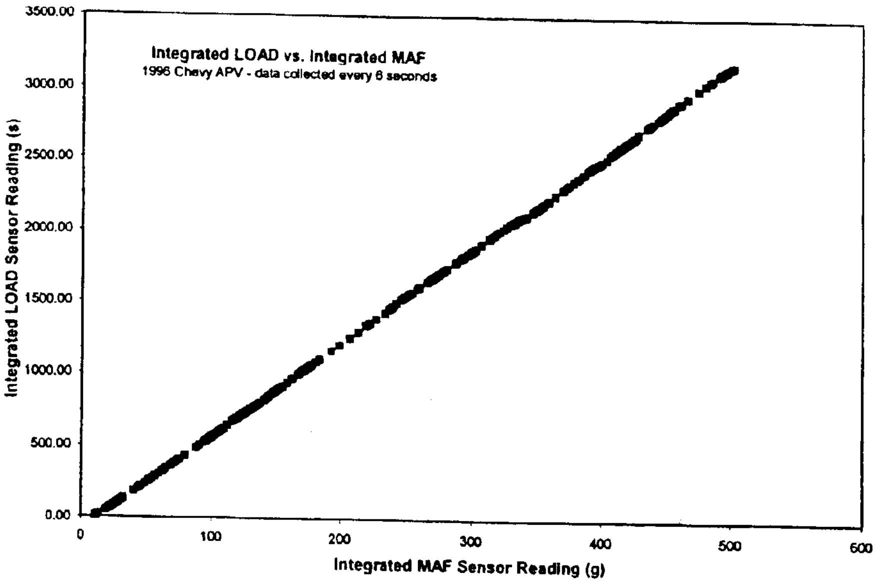

FIGS. 8A and 8B show data for a vehicle for which equations 1 and 2, above, would be used to determine $\Delta\Sigma MAF^*_i$ if a MAF sensor was not present in the vehicle. In this case, FIG. 8A shows that $\Sigma LOAD{*}RPM_i$ plotted vs. $\Delta\Sigma MAF_i$ is not perfectly linear, while $\Sigma LOAD_i$ plotted vs. $\Delta\Sigma MAF_i$ shown in Fi. 8B is nearly perfectly linear.

Table 1, below, indicates the accuracy of fuel efficiency determined using $\Delta\Sigma MAF_i$ as described above. For this experiment data were measured and transmitted by separate wireless appliances deployed in a 2000 Toyota Tacoma and a 2000 Chevrolet Suburban. The data were processed according to FIG. 2 above to determine the values in the 'Calculated' column. Actual MPG was determined by recording the actual miles driven using the vehicles' odometer, and carefully measuring the amount of fuel consumed by each vehicle.

As is clear from the table, the accuracy of the MAF-based fuel efficiency is better than +/−2% for both vehicles. It is noted that errors for the ΔF and ΔFE values are likely due to the estimated error associated with the fuel density and constant air/fuel ratio (14.5) used for the calculation. Errors for all properties may also be due to the assumption that VSS (used to calculate ODO) and MAF (used to calculate AF) are considered to be constant between queries to the engine computer (every 20 seconds in this case). This assumption may not be valid depending on driving conditions.

TABLE 1 calculated and actual measured fuel-efficiency data

| Parameter | Actual | Calculated | Difference |
|---|---|---|---|
| CASE 1 - 2000 Chevrolet Suburban | | | |
| ΔODO | 330 | 300 | −10.0% |
| ΔF | 35.4 | 32.0 | −10.6% |
| ΔFE | 9.32 | 9.38 | +0.6% |
| CASE 2 - 2000 Toyota Tacoma | | | |
| ΔODO | 27.4 | 27.0 | −1.5% |
| ΔF | 1.02 | 1.10 | +7.3% |
| ΔFE | 24.2 | 23.9 | −1.3% |

Figure 5:
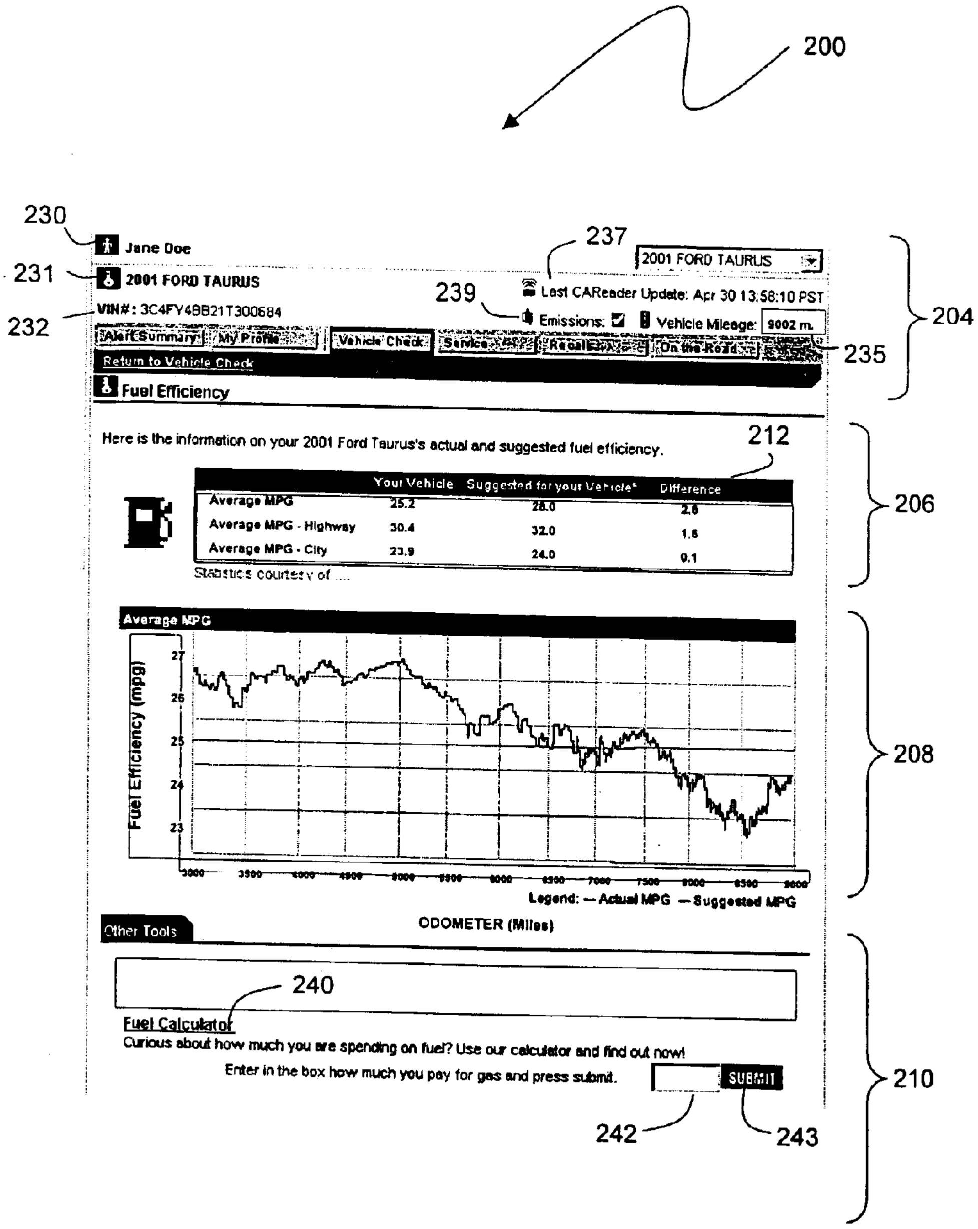
FIG. 5 is a screen capture of a web page from a web site of FIG. 1 that displays fuel efficiency measured from a vehicle over time.

FIG. 5 shows a web page 200 that displays the fuel efficiency as described above. The web page 200 includes a header section 204 that describes the vehicle being analyzed; a summary section 206 that lists average fuel efficiency data for city and highway driving; a graphing section 208 that plots fuel efficiency as a function of odometer calculation; and an 'other tools' section 210 that displays the fuel efficiency data is other ways, one of which is described with reference to FIG. 6. In this case, 'city' driving is driving done at 40 m.p.h or below; 'highway' driving is done above this speed.

The summary section 206 includes a fuel-efficiency table 212 that features fuel efficiency for highway and city driving, and average fuel efficiency. Highway and city driving are determined by analyzing other data included in the data packet that is indicative of driving patterns, e.g. the vehicle's speed and PRNDL position. The table 212 shows the vehicle's fuel efficiency for the different driving conditions, the suggested fuel efficiency, and the difference between the two values. The suggested fuel efficiency is taken from the vehicle's specifications for highway and city driving.

The graphing section 208 plots the vehicle's fuel efficiency, determined as described above, as a function of odometer calculation. Each data point in the plot represents fuel efficiency datum calculated from data contained in a single data packet. Alternatively, each data point may represent an average taken over a specific time or mileage interval. Along with the actual data points, the graphing section 208 includes a solid line describing the vehicle's average fuel efficiency, which in this case is 25.2 miles/gallon.

The header section 204 of the web page 200 displays information relating to the vehicle, e.g., fields for the vehicle's owner 230, its year/make/model 231 and vehicle identification number (VIN) 232. The VIN is a unique 17-digit vehicle identification number that functions effectively as the vehicle's serial number. The header section also includes fields for the vehicle's mileage 235, the last time a data packet was received 237, and an icon 239 that indicates the current status of the vehicle's emissions test. The icon is a green checkmark since the latest emissions test gave a 'pass' result. The emissions test is described in more detail in the pending application entitled 'INTERNET-BASED EMISSIONS TEST FOR VEHICLES', filed Apr. 30, 2001, the contents of which are incorporated herein by reference.

Figure 6:
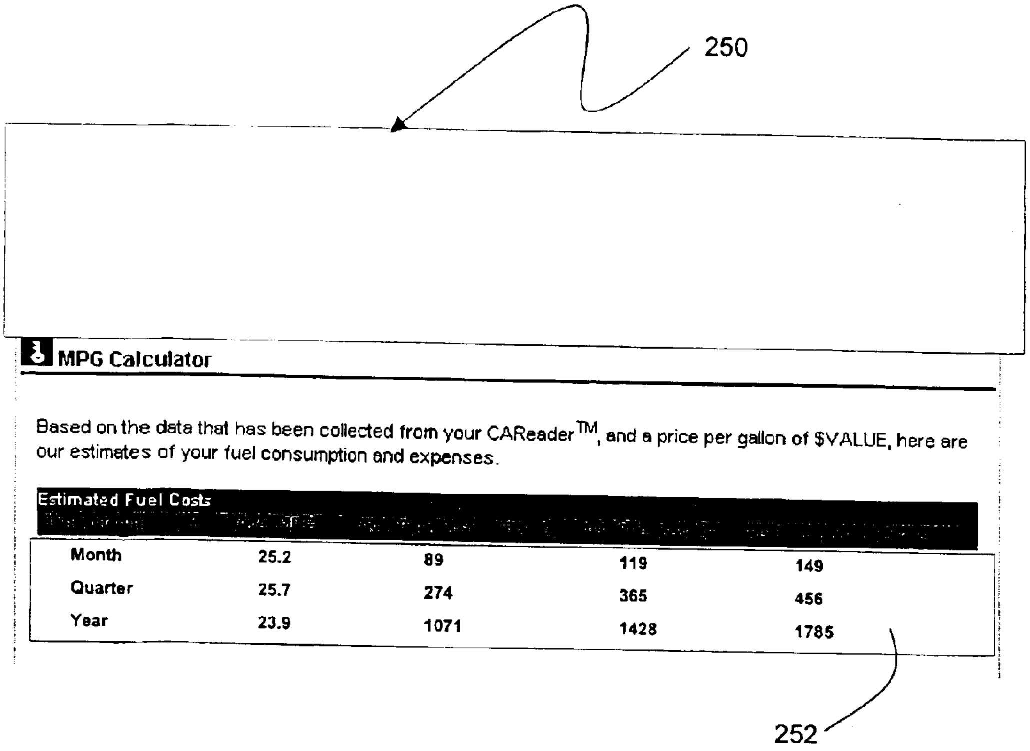
FIG. 6 is a screen capture of a web page from a web site of FIG. 1 that displays a calculator for determining fuel costs over periods ranging from a month to a year.

The 'other tools' section 208 features a fuel calculator 240 that wherein a user enters a fuel cost in an entry field 242, and then presses a submit button 243. This initiates a calculation that processes the amount of fuel consumed by the vehicle and the fuel cost to determine the amount of money the vehicle's owner is spending on fuel. FIG. 6 shows the calculator 250 in more detail. It features a table 252 that includes average fuel costs for the month, quarter, and year based on the calculated amount of fuel consumed and the above-described fuel cost. To account for fluctuations in the price of gas, the table 252 also includes entries wherein the average fuel costs are both increased and decreased by 25% to give upper and lower limits on the approximate fuel costs.

Other embodiments are also within the scope of the invention. In particular, the web pages used to display the data can take many different forms, as can the manner in which the data are displayed. Web pages are typically written in a computer language such as 'HTML' (hypertext mark-up language), and may also contain computer code written in languages such as java for performing certain functions (e.g., sorting of names). The web pages are also associated with database software, e.g. an Oracle-based system, that is used to store and access data. Equivalent versions of these computer languages and software can also be used.

Different web pages may be designed and accessed depending on the end-user. As described above, individual users have access to web pages that only show data for the particular vehicle, while organizations that support a large number of vehicles (e.g. automotive dealerships, the EPA, California Air Resources Board, or an emissions-testing organization) have access to web pages that contain data from a collection of vehicles. These data, for example, can be sorted and analyzed depending on vehicle make, model, odometer calculation, and geographic location. The graphical content and functionality of the web pages may vary substantially from what is shown in the above-described figures. In addition, web pages may also be formatted using standard wireless access protocols (WAP) so that they can be accessed using wireless devices such as cellular telephones, personal digital assistants (PDAs), and related devices.

The web pages also support a wide range of algorithms that can be used to analyze data once it is extracted from the data packets. For example, a vehicle's fuel efficiency can also be determined by monitoring a vehicle's fuel level and odometer calculation. This, of course, is only possible on vehicles with engine computers that report fuel level. In another embodiment, manifold air pressure (MAP) can be analyzed in combination with the ideal gas laws to determine mass air flow. In still other embodiments, fuel level determined using any of the above-mentioned algorithms is further analyzed to determine other properties of a vehicle. For example, a decrease in fuel level can be analyzed to estimate if one or more tires on the vehicle is under-inflated. Or it can be analyzed to determine a clogged fuel-injection system. In general, any property of a vehicle that affects fuel efficiency can be characterized to some extent by the above-mentioned algorithms.

Other embodiments are also possible. In addition, other algorithms for analyzing other data can also be used in combination with the above-described method for calculating fuel efficiency. Such an algorithm is defined in the application entitled "WIRELESS DIAGNOSTIC SYSTEM FOR CHARACTERIZING A VEHICLE'S EXHAUST EMISSIONS", filed Feb. 1, 2001, the contents of which are incorporated herein by reference.

The fuel efficiency measurement above only shows results for a single vehicle. But the system is designed to test multiple vehicles and multiple secondary computer systems, each connected to the web site through the Internet. Similarly, the host computer system used to host the website may include computers in different areas, i.e. the computers may be deployed in separate data centers resident in different geographical locations.

The fuel efficiency measurement described is performed at a pre-set time interval (e.g., once every 10 minutes). Alternatively, the measurement is performed once authorized by a user of the system (e.g., using a button on the website). In still other embodiments, the measurement is performed when a data parameter (e.g. engine coolant temperature) exceeded a predetermined value. Or a third party, such as the EPA, could initiate the test. In some cases, multiple parameters (e.g., engine speed and load) can be analyzed to determine when to initiate a test. In general, the measurement could be performed after analyzing one or more data parameters using any type of algorithm. These algorithms range from the relatively simple (e.g., determining mileage values for each vehicle in a fleet) to the complex (e.g., predictive engine diagnoses using 'data mining' techniques). Data analysis may be used to characterize an individual vehicle as described above, or a collection of vehicles, and can be used with a single data set or a collection of historical data. Algorithms used to characterize a collection of vehicles can be used, for example, for remote vehicle or parts surveys, to characterize fuel efficiency performance in specific geographic locations, or to characterize traffic.

Fuel efficiency can also be analyzed using a number of different techniques. For example, data transmitted by the wireless appliance can be averaged and then displayed. For the graphical display (e.g., that shown in FIG. 5), a running average may be displayed as a way of reducing noise in the data. In other embodiments, the data may be displayed so that not every point is plotted (e.g., every $5^{th}$ point could be plotted) so that noise is reduced. The data may also be fit with a mathematical function for further analysis.

In other embodiments, fuel efficiency and other diagnostic data are analyzed to estimate other properties of the vehicle, such as tire pressure and status of the fuel-injection system. In one embodiment, the above-described system collects a vehicle's fuel efficiency and analyzes these data to determine any systematic, time-dependent trends. The system then similarly analyzes short and long-term fuel trim values. A systematic, time-dependent decreasing trend in fuel efficiency typically indicates that either the vehicle's average tire pressure is low or that its fuel-injection system is clogged. Lack of a time-dependent increase or decrease in the fuel trim values indicates that vehicle's fuel-injection system is working properly. In this case, the time-dependent decrease in the vehicle's fuel efficiency indicates that the average tire pressure is low. Alternatively, a systematic increase or decrease in a vehicle's short and long-term fuel trim values, coupled with a systematic decrease in fuel efficiency, indicates a possible problem with the vehicle's fuel-injection system.

In other embodiments, additional hardware can be added to the in-vehicle wireless appliance to increase the number of parameters in the transmitted data. For example, hardware for global-positioning systems (GPS) may be added so that the location of the vehicle can be monitored along with its data. Or the radio modem used to transmit the data may employ a terrestrial GPS system, such as that available on modems designed by Qualcomm, Inc. In still other embodiments, the location of the base station that transmits the message can be included in the data packet and analyzed to determine the vehicle's approximate location. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system. These data can then be further analyzed along with the vehicle's fuel efficiency.

In other embodiments, the antenna used to transmit the data packet is embedded in the wireless appliance, rather than being exposed.

In still other embodiments, data processed using the above-described systems can be used for: remote billing/payment of tolls; remote payment of parking/valet services; remote control of the vehicle (e.g., in response to theft or traffic/registration violations); and general survey information.

Still other embodiments are within the scope of the following claims.

What is claimed is:

1. A method of characterizing a vehicle's fuel efficiency, comprising:

(a) wirelessly receiving, by a computer system and from the vehicle, data comprising at least one property or processed property, wherein a property comprises at least one of vehicle speed, odometer calculation, fuel level, engine speed, load, mass air flow, and manifold air pressure, and wherein a processed property is derived from at least one property;

(b) analyzing the received data to determine the vehicle's fuel efficiency;

(c) outputting the vehicle's fuel efficiency, comprising displaying the fuel efficiency on at least one web page accessible by at least one of a user of the vehicle and a vehicle service entity;

(d) displaying at least a portion of the received data on the at least one web page;

(e) comparing the vehicle's fuel efficiency to a predetermined parameter;

(f) processing the vehicle's fuel efficiency to determine a secondary property of the vehicle, wherein the secondary property is one of tire pressure, status of a fuel injection system, and fuel quality;

(g) sending, to a user, the vehicle's fuel efficiency or a property derived therefrom, wherein sending comprises sending an electronic text, data, or voice message to a computer, cellular telephone, or wireless device;

(h) sending a message when the vehicle's fuel efficiency falls below a predetermined level; and (i) wirelessly receiving GPS data associated with the vehicle, wherein the vehicle is at a location remote from a service or diagnostic entity, wherein analyzing the received data is performed at a configurable, predetermined or random interval, and wherein the interval is a mileage or time interval, and wherein analyzing the received data includes applying at least one algorithm.

2. A method of characterizing a vehicle's fuel efficiency, comprising:

(a) wirelessly receiving, by a computer system and from the vehicle, data comprising at least one property or processed property, wherein a property comprises at least one of vehicle speed, odometer calculation, fuel level, engine speed, load, mass air flow, and manifold air pressure, and wherein a processed property is derived from at least one property;

(b) analyzing the received data to determine the vehicle's fuel efficiency; and (c) outputting the vehicle's fuel efficiency.

3. The method of claim 2, wherein outputting the vehicle's fuel efficiency comprises displaying the fuel efficiency on at least one web page.

4. The method of claim 3, wherein the at least one web page is accessible by at least one of a user of the vehicle and a vehicle service entity.

5. The method of claim 3, further comprising displaying at least a portion of the received data on the at least one web page.

6. The method of claim 3, wherein the at least one web page is accessible by at least one of a user of the vehicle, a vehicle service entity, a vehicle dealership, a governmental entity, and a nongovernmental organization.

7. The method of claim 2, further comprising comparing the vehiclc's fuel efficiency to a predetermined parameter.

8. The method of claim 2, further comprising processing the vehicle's fuel efficiency to determine a secondary property of the vehicle.

9. The method of claim 8, wherein the secondary property is one of tire pressure, status of a fuel injection system, and fuel quality.

10. The method of claim 2, further comprising sending, to a user, the vehicle's fuel efficiency or a property derived therefrom.

11. The method of claim 10, wherein sending comprises sending an electronic text, data, or voice message to a computer, cellular telephone, or wireless device.

12. The method of claim 2, wherein a processed property comprises a summed property.

13. The method of claim 12, wherein the processed property comprises the summed property multiplied by a time interval.

14. The method of claim 12, wherein the summed property includes at least one property or processed property multiplied by a time interval prior to summing.

15. The method of claim 12, wherein the summed property includes at least one summed property or processed property.

16. The method of claim 15, wherein at least one of mass air flow, load, and load times engine speed is summed.

17. The method of claim 15, wherein at least one of mass air flow, load, and load times engine speed multiplied by a time interval is summed.

18. The method of claim 15, wherein the property summed is mass air flow, wherein analyzing the received data further comprises processing the summed mass air flow to determine an amount of fuel consumed.

19. The method of claim 15, wherein the processed property summed is mass air flow multiplied by a time interval, wherein analyzing the received data further comprises processing the summed mass air flow times a time interval to determine an amount of fuel consumed.

20. The method of claim 15, wherein the mass air flow or a product thereof is summed to generate an integrated mass air flow.

21. The method of claim 20, wherein analyzing the received data further comprises processing the integrated mass air flow to determine an amount of fuel consumed.

22. The method of claim 21, wherein analyzing the received data further comprises:

(i) dividing the integrated mass air flow by an air/fuel ratio; and (ii) dividing the results from (i) by a density of fuel to determine an amount of fuel consumed.

23. The method of claim 22, wherein analyzing the received data further comprises processing the amount of fuel consumed to determine fuel efficiency.

24. The method of claim 23, wherein analyzing the received data further comprises dividing the amount of fuel consumed by a distance driven to determine fuel efficiency.

25. The method of claim 2, wherein the data comprises at least one of load, load times engine speed, load multiplied by a time interval, and load times engine speed multiplied by a time interval, and analyzing the received data further comprises processing the data to determine an amount of fuel consumed.

26. The method of claim 25, wherein the load, load times engine speed, or a product thereof is summed to generate an integrated value.

27. The method of claim 26, wherein analyzing the received data further comprises processing the integrated value to determine an amount of fuel consumed.

28. The method of claim 27, wherein analyzing the received data further comprises multiplying the integrated value with a linear value to determine an integrated synthetic mass air flow.

29. The method of claim 28, wherein analyzing the received data further includes:

(i) dividing the integrated synthetic mass air flow by an air/fuel ratio; and (ii) dividing the results from (i) by a density of fuel to determine an amount of fuel consumed.

30. The method of claim 29, wherein analyzing the received data further comprises processing the amount of fuel consumed to determine fuel efficiency.

31. The method of claim 29, wherein analyzing the received data further comprises dividing the amount of fuel consumed by a distance driven to determine fuel efficiency.

32. The method of claim 2, wherein the vehicle is selected from a group comprising an automobile, truck, wheeled commercial equipment, heavy truck, power sport vehicle, collision repair vehicle, marine vehicle, and recreational vehicle.

33. The method of claim 2, wherein the vehicle is at a location remote from a service or diagnostic entity.

34. The method of claim 2, wherein analyzing the received data is performed at a configurable, predetermined or random interval.

35. The method of claim 34, wherein the interval is a mileage or time interval.

36. The method of claim 34, wherein the interval is responsive to an input of a third party entity.

37. The method of claim 34, further comprising wirelessly transmitting a schema configured to change the interval.

38. The method of claim 2, wherein wirelessly receiving the data comprises continuously monitoring a plurality of vehicles.

39. The method of claim 2, further comprising sending a message when the vehicle's fuel efficiency falls below a predetermined level.

40. The method of claim 2, wherein analyzing the received data includes applying at least one algorithm.

41. The method of claim 40, wherein the at least one algorithm relates to at least one of a remote vehicle or part survey, characterization of fuel efficiency performance in a location, and traffic characterization.

42. The method of claim 2, wherein analyzing the received data includes determining a systematic or time-dependent trend reflected by the data.

43. The method of claim 2, further comprising wirelessly receiving GPS data associated with the vehicle.

44. The method of claim 2, further comprising:

wirelessly receiving at least one of tire pressure and temperature data associated with the vehicle; and analyzing the received data.

45. The method of claim 2, further comprising processing the vehicle's fuel efficiency to characterize the vehicle's fuel-injection system or estimate a tire pressure value.

46. A method of characterizing a vehicle's fuel efficiency, comprising:

(a) generating data comprising at least one property or processed property of the vehicle, wherein a property comprises at least one of vehicle speed, odometer calculation, fuel level, engine speed, load, mass air flow, and manifold air pressure, and wherein a processed property is derived from at least one property;

(b) transferring the data to a wireless appliance comprising, (i) a microprocessor, and (ii) a wireless transmitter interfaced with the microprocessor;

(c) wirelessly transmitting the data, wherein at least one of generating, transferring, and wirelessly transmitting data is performed at a configurable, predetermined or random interval, wherein the interval is a mileage or time interval, and wherein the interval is responsive to an input of a third party entity;

(d) wirelessly receiving a schema configured to change the interval; and (e) wirelessly transmitting GPS data associated with the vehicle, wherein generating data comprises summing a property to derive a processed property, wherein generating data further comprises multiplying at least one property or processed property by a time interval prior to the summing, wherein the summed property includes at least one property or processed property, wherein the vehicle is at a location remote from a service or diagnostic entity, and wherein transferring the data includes serially transferring the data through an OBD-II connector in the vehicle to the wireless appliance.

47. A method of characterizing a vehicle's fuel efficiency comprising:

(a) generating data comprising at least one property or processed property of the vehicle, wherein a property comprises at least one of vehicle speed, odometer calculation, fuel level, engine speed, load, mass air flow, and manifold air pressure, and wherein a processed property is derived from at least one property;

(b) transferring the data to a wireless appliance comprising, (i) a microprocessor, and (ii) a wireless transmitter interfaced with the microprocessor; and (c) wirelessly transmitting the data.

48. The method of claim 47, wherein generating data further comprises summing a property to derive a processed property.

49. The method of claim 48, wherein generating data further comprises multiplying the summed property by a time interval to derive the processed property.

50. The method of claim 48, wherein generating data further comprises multiplying at least one property or processed property by a time interval prior to the summing.

51. The method of claim 48, wherein the summed property includes at least one property or processed property.

52. The method of claim 51, wherein at least one of mass air flow, load, and load times engine speed is summed.

53. The method of claim 47, wherein generating data further comprises summing mass air flow multiplied by a time interval.

54. The method of claim 47, wherein generating data further comprises summing mass air flow or a product thereof to generate an integrated mass air flow.

55. The method of claim 47, wherein the data comprises at least one of load, load times engine speed, load multiplied by a time interval, and load times engine speed multiplied by a time interval.

56. The method of claim 55, wherein generating data includes summing the load, load times engine speed, or a product thereof to generate an integrated value.

57. The method of claim 47, wherein the vehicle is selected from a group comprising an automobile, truck, wheeled commercial equipment, heavy truck, power sport vehicle, collision repair vehicle, marine vehicle, and recreational vehicle.

58. The method of claim 47, wherein the vehicle is at a location remote from a service or diagnostic entity.

59. The method of claim 47, wherein at least one of generating, transferring, and wirelessly transmitting data is performed at a configurable, predetermined or random interval.

60. The method of claim 59, wherein the interval is a mileage or time interval.

61. The method of claim 59, wherein the interval is responsive to an input of a third party entity.

62. The method of claim 59, further comprising wirelessly receiving a schema configured to change the interval.

63. The method of claim 47, further comprising wirelessly transmitting GPS data associated with the vehicle.

64. The method of claim 47, further comprising wirelessly transmitting at least one of tire pressure and temperature data associated with the vehicle.

65. The method of claim 47, wherein transferring the data includes serially transferring the data through an OBD-II connector in the vehicle to the wireless appliance.

66. A programmed apparatus, programmed to execute a method comprising:

(a) wirelessly receiving, by a computer system and from the vehicle, data comprising at least one property or processed property, wherein a property comprises at least one of vehicle speed, odometer calculation, fuel level, engine speed, load, mass air flow, and manifold air pressure, and wherein a processed property is derived from at least one property;

(b) analyzing the received data to determine the vehicle's fuel efficiency;

(c) outputting the vehicle's fuel efficiency, comprising displaying the fuel efficiency on at least one web page accessible by at least one of a user of the vehicle and a vehicle service entity;

(d) displaying at least a portion of the received data on the at least one web page;

(e) comparing the vehicle's fuel efficiency to a predetermined parameter;

(f) processing the vehicle's fuel efficiency to determine a secondary property of the vehicle, wherein the secondary property is one of tire pressure, status of a fuel injection system, and fuel quality;

(g) sending, to a user, the vehicle's fuel efficiency or a property derived therefrom, wherein sending comprises sending an electronic text, data, or voice message to a computer, cellular telephone, or wireless device;

(h) sending a message when the vehicle's fuel efficiency falls below a predetermined level; and (i) wirelessly receiving GPS data associated with the vehicle, wherein the vehicle is at a location remote from a service or diagnostic entity, wherein analyzing the received data is performed at a configurable, predetermined or random interval, and wherein the interval is a mileage or time interval, and wherein analyzing the received data includes applying at least one algorithm.

67. A programmed apparatus, programmed to execute a method comprising:

(a) wirelessly receiving, by a computer system and from a vehicle, data comprising at least one property or processed property, wherein a property comprises at least one of vehicle speed, odometer calculation, fuel level, engine speed, load, mass air flow, and manifold air pressure, and wherein a processed property is derived from at least one property;

(b) analyzing the received data to determine the vehicle's fuel efficiency; and (c) outputting the vehicle's fuel efficiency.

68. The programmed apparatus of claim 67, wherein outputting the vehicle's fuel efficiency comprises displaying the fuel efficiency on at least one web page.

69. The programmed apparatus of claim 68, wherein the at least one web page is accessible by at least one of a user of the vehicle and a vehicle service entity.

70. The programmed apparatus of claim 68, wherein the method further comprises displaying at least a portion of the received data on the at least one web page.

71. The programmed apparatus of claim 68, wherein the at least one web page is accessible by at least one of a user of the vehicle, a vehicle service entity, a vehicle dealership, a governmental entity, and a nongovernmental organization.

72. The programmed apparatus of claim 67, wherein the method further comprises comparing the vehicle's fuel efficiency to a predetermined parameter.

73. The programmed apparatus of claim 67, wherein the method further comprises processing the vehicle's fuel efficiency to determine a secondary property of the vehicle.

74. The programmed apparatus of claim 67, wherein the method further comprises sending, to a user, the vehicle's fuel efficiency or a property derived therefrom.

75. The programmed apparatus of claim 67, wherein the vehicle is selected from a group comprising an automobile, truck, wheeled commercial equipment, heavy truck, power sport vehicle, collision repair vehicle, marine vehicle, and recreational vehicle.

76. The programmed apparatus of claim 67, wherein the vehicle is at a location remote from a service or diagnostic entity.

77. The programmed apparatus of claim 67, wherein analyzing the received data is performed at a configurable, predetermined or random interval.

78. The programmed apparatus of claim 77, wherein the method further comprises wirelessly transmitting a schema configured to change the interval.

79. The programmed apparatus of claim 67, wherein analyzing the received data includes applying at least one algorithm.

80. The programmed apparatus of claim 67, wherein analyzing the received data includes determining a systematic or time-dependent trend reflected by the data.

81. The programmed apparatus of claim 67, wherein the method further comprises wirelessly receiving GPS data associated with the vehicle.

82. A programmed apparatus, programmed to execute a method comprising:

(a) generating data comprising at least one property or processed property of the vehicle, wherein a property comprises at least one of vehicle speed, odometer calculation, fuel level, engine speed, load, mass air flow, and manifold air pressure, and wherein a processed property is derived from at least one property;

(b) transferring the data to a wireless appliance comprising, (i) a microprocessor, and (ii) a wireless transmitter interfaced with the microprocessor;

(c) wirelessly transmitting the data, wherein at least one of generating, transferring, and wirelessly transmitting data is performed at a configurable, predetermined or random interval, wherein the interval is a mileage or time interval, and wherein the interval is responsive to an input of a third party entity;

(d) wirelessly receiving a schema configured to change the interval; and (e) wirelessly transmitting GPS data associated with the vehicle, wherein generating data comprises summing a property to derive a processed property, wherein generating data comprises multiplying at least one property or processed property by a time interval prior to the summing, wherein the summed property includes at least one property or processed property, wherein the vehicle is at a location remote from a service or diagnostic entity, and wherein transferring the data includes serially transferring the data through an OBD-II connector in the vehicle to the wireless appliance.

83. A programmed apparatus, programmed to execute a method comprising:

(a) generating data comprising at least one property or processed property of a vehicle, wherein a property comprises at least one of vehicle speed, odometer calculation, fuel level, engine speed, load, mass air flow, and manifold air pressure, and wherein a processed property is derived from at least one property;

(b) transferring the data to a wireless appliance comprising, (i) a microprocessor, and (ii) a wireless transmitter interfaced with the microprocessor; and (c) wirelessly transmitting the data.

84. The programmed apparatus of claim 83, wherein the vehicle is selected from a group comprising an automobile, truck, wheeled commercial equipment, heavy truck, power sport vehicle, collision repair vehicle, marine vehicle, and recreational vehicle.

85. The programmed apparatus of claim 83, wherein the vehicle is at a location remote from a service or diagnostic entity.

86. The programmed apparatus of claim 83, wherein at least one of generating, transferring, and wirelessly transmitting data is performed at a configurable, predetermined or random interval.

87. The programmed apparatus of claim 86, wherein the method further comprises wirelessly receiving a schema configured to change the interval.

88. The programmed apparatus of claim 83, wherein the method further comprises wirelessly transmitting GPS data associated with the vehicle.

89. The programmed apparatus of claim 83, wherein transferring the data includes serially transferring the data through an OBD-II connector in the vehicle to the wireless appliance.

90. A machine-readable medium encoded with a plurality of processor-executable instructions for:

(a) wirelessly receiving, by a computer system and from a vehicle, data comprising at least one property or processed property, wherein a property comprises at least one of vehicle speed, odometer calculation, fuel level, engine speed, load, mass air flow, and manifold air pressure, and wherein a processed property is derived from at least one property;

(b) analyzing the received data to determine the vehicle's fuel efficiency; and (c) outputting the vehicle's fuel efficiency.

91. The machine-readable medium of claim 90, wherein outputting the vehicle's fuel efficiency comprises displaying the fuel efficiency on at least one web page.

92. The machine-readable medium of claim 91, wherein the at least one web page is accessible by at least one of a user of the vehicle, a vehicle service entity, a vehicle dealership, a governmental entity, and a nongovernmental organization.

93. The machine-readable medium of claim 90, wherein the vehicle is selected from a group comprising an automobile, truck, wheeled commercial equipment, heavy truck, power sport vehicle, collision repair vehicle, marine vehicle, and recreational vehicle.

94. The machine-readable medium of claim 90, wherein analyzing the received data is performed at a configurable, predetermined or random interval.

95. The machine-readable medium of claim 90 further comprising processor-executable instructions for wirelessly receiving GPS data associated with the vehicle.

96. A machine-readable medium encoded with a plurality of processor-executable instructions for:

(a) generating data comprising at least one property or processed property of a vehicle, wherein a property comprises at least one of vehicle speed, odometer calculation, fuel level, engine speed, load, mass air flow, and manifold air pressure, and wherein a processed property is derived from at least one property;

(b) transferring the data to a wireless appliance comprising, (i) a microprocessor, and (ii) a wireless transmitter interfaced with the microprocessor; and (c) wirelessly transmitting the data.

97. The machine-readable medium of claim 96, wherein the vehicle is selected from a group comprising an automobile, truck, wheeled commercial equipment, heavy truck, power sport vehicle, collision repair vehicle, marine vehicle, and recreational vehicle.

98. The machine-readable medium of claim 96, wherein at least one of generating, transferring, and wirelessly transmitting data is performed at a configurable, predetermined or random interval.

99. The machine-readable medium of claim 96, further comprising processor-executable instructions for wirelessly transmitting GPS data associated with the vehicle.

* * * * *